United States Patent
Martin

(10) Patent No.: US 6,550,350 B2
(45) Date of Patent: Apr. 22, 2003

(54) BOOT FOR A RACK AND PINION STEERING GEAR ASSEMBLY

(75) Inventor: Jon W. Martin, Loudon, TN (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/880,323

(22) Filed: Jun. 13, 2001

(65) Prior Publication Data

US 2002/0189890 A1 Dec. 19, 2002

(51) Int. Cl.[7] .................................................. F16D 3/84
(52) U.S. Cl. ........................ 74/18.2; 74/422; 277/635; 277/637; 464/175
(58) Field of Search .............................. 74/18.1, 18.2, 74/422, 498, 580; 277/634, 635, 636, 637; 403/134; 464/175

(56) References Cited

U.S. PATENT DOCUMENTS

| | | | | |
|---|---|---|---|---|
| 3,951,045 A | * | 4/1976 | Frei et al. ........................ 74/498 |
| 4,121,844 A | * | 10/1978 | Nemoto et al. ................ 74/18.1 |
| 4,572,024 A | * | 2/1986 | Narita ........................ 74/422 X |
| 4,639,459 A | * | 1/1987 | Amrath .................... 74/18.2 X |
| 4,673,188 A | * | 6/1987 | Matsuno et al. ......... 74/18.2 X |
| 4,819,499 A | | 4/1989 | Morell | |
| 4,878,389 A | * | 11/1989 | Boge .......................... 74/18.1 |
| 5,051,105 A | * | 9/1991 | Sugiura et al. .............. 464/175 |
| 5,379,856 A | | 1/1995 | Blee | |
| 5,730,040 A | | 3/1998 | Strong | |
| 5,853,178 A | * | 12/1998 | Wydra et al. ................ 277/636 |
| 6,026,924 A | | 2/2000 | Godek | |

* cited by examiner

Primary Examiner—Thomas R. Hannon
Assistant Examiner—Colby Hansen
(74) Attorney, Agent, or Firm—Tarolli, Sundheim, Covell & Tummino L.L.P.

(57) ABSTRACT

An apparatus (10) includes a tie rod (151) for a vehicle steering system. The tie rod (151) has an axis (159), a first cylindrical portion (251) with a first outer surface (261) of a first diameter (271), and a second cylindrical portion (252) coaxial with the first cylindrical portion (251). The second cylindrical portion (252) has a second outer surface (262) of a second diameter (272) smaller than the first diameter (271). The tie rod (151) has a ring portion (281) projecting radially from the second outer surface (262) of the second cylindrical portion (252). The ring portion (281) has a third outer surface (362) extending axially along the second cylindrical portion (252). A boot seal (32) encircles the second cylindrical portion (252). The boot seal (32) has a sealing surface (325) in sealing contact with the third outer surface (362) of the ring portion (281). The sealing surface (325) defines a groove (327) in the boot seal (32). The ring portion (281) is located in the groove (327).

14 Claims, 2 Drawing Sheets

BOOT FOR A RACK AND PINION STEERING GEAR ASSEMBLY

FIELD OF THE INVENTION

The present invention relates to a steering gear apparatus and, more specifically, to a boot seal and a steering gear tie rod associated with the boot seal.

BACKGROUND OF THE INVENTION

A conventional rack and pinion steering apparatus for a vehicle has a ball joint connecting a rack to a tie rod and a bearing that supports a rack for movement relative to a housing. A boot seal seals against the housing and the tie rod. If the boot seal does not properly seal against the housing or the tie rod, dirt, water and other contaminants may enter the boot seal. If this occurs, operation of the steering gear may be affected. A long lasting and inexpensive boot seal that effectively seals against the housing and tie rod over a long period of time is desirable.

Typically, a boot seal is made with an internal diameter smaller than the outer diameter of the part on which it is to seal. This requires some stretching of the boot seal in order to engage the part. The materials of which some boot seals are made do not recover one-hundred percent (100%) after stretching. Also, the materials of which some boot seals are made are not readily compressible. Accordingly, such a boot seal, if stretched prior to installation, may not completely seal entirely around the part.

In some systems the part, for example a tie rod for a vehicle steering system, may have a circumferential groove machined into the part and the boot seal may have a ring of material on its internal diameter to be located in the groove. The diameter of the ring must be stretched over the tie rod and then spring back to fit into the groove. In these systems, there is a potential for an inadequate seal. Accordingly, it would be desirable to provide a boot seal for a tie rod that may be installed with a minimum of stretching of the boot seal.

SUMMARY OF THE INVENTION

In accordance with the present invention, an apparatus includes a tie rod for a vehicle steering system and a boot seal. The tie rod has a longitudinal axis, a first cylindrical portion with a first outer surface of a first diameter, and a second cylindrical portion coaxial with the first cylindrical portion. The second cylindrical portion has a second outer surface of a second diameter. The second diameter is smaller than the first diameter. The tie rod has a ring portion projecting radially from the second outer surface of the second cylindrical portion. The ring portion extends circumferentially completely around the axis of the tie rod. The ring portion is spaced axially from the first cylindrical portion. The ring portion has a third outer surface extending axially along the second cylindrical portion. The boot seal encircles the second cylindrical portion. The boot seal has a sealing surface in sealing contact with the third outer surface of the ring portion. The sealing surface of the boot seal defines a groove in the boot seal. The ring portion of the tie rod is located in the groove.

In accordance with another feature of the present invention, an apparatus includes a tie rod for a vehicle steering system and a boot seal. The tie rod has a longitudinal axis, a first cylindrical portion with a first outer surface of a first diameter, and a second cylindrical portion coaxial with the first cylindrical portion. The second cylindrical portion has a second outer surface of a second diameter. The second diameter is smaller than the first diameter. The boot seal encircles the second cylindrical portion. The tie rod has a torus-shaped ring portion projecting radially from the second outer surface of the second cylindrical portion. The torus-shaped ring portion extends circumferentially completely around the axis of the tie rod. The torus-shaped ring portion is spaced axially from the first cylindrical portion. The ring portion has a third outer surface extending axially along the second cylindrical portion. The torus-shaped ring portion curves radially outward from axially spaced locations on the second outer surface of the second cylindrical portion. The boot seal has a sealing surface in sealing contact with the third outer surface of the torus-shaped ring portion. The sealing surface of the boot seal defines a groove in the boot seal. The torus-shaped ring portion of the tie rod is located in the groove.

In accordance with still another feature of the present invention, an apparatus includes a tie rod for a vehicle steering system and a boot seal. The tie rod has a longitudinal axis, a first cylindrical portion with a first outer surface of a first diameter, and a second cylindrical portion coaxial with the first cylindrical portion. The second cylindrical portion has a second outer surface of a second diameter. The second diameter is smaller than the first diameter. The boot seal encircles the second cylindrical portion. The tie rod has a ring portion projecting radially from the second outer surface of the second cylindrical portion. The ring portion extends circumferentially completely around the axis of the tie rod. The ring portion is spaced axially from the first cylindrical portion. The ring portion has a third outer surface extending axially along the second cylindrical portion. The ring portion comprises at least part of male threads extending radially from the second cylindrical portion. The boot seal has a sealing surface in sealing contact with the third outer surface of the ring portion. The sealing surface of the boot seal defines a groove in the boot seal. The ring portion of the tie rod is located in the groove. The groove comprises at least part of female threads engaging the male threads of the tie rod.

BRIEF DESCRIPTION OF THE DRAWINGS

The foregoing and other features of the present invention will become apparent to those skilled in the art to which the present invention relates upon reading the following description with reference to the accompanying drawings, in which.

DETAILED DESCRIPTION OF THE INVENTION

Figure 1:
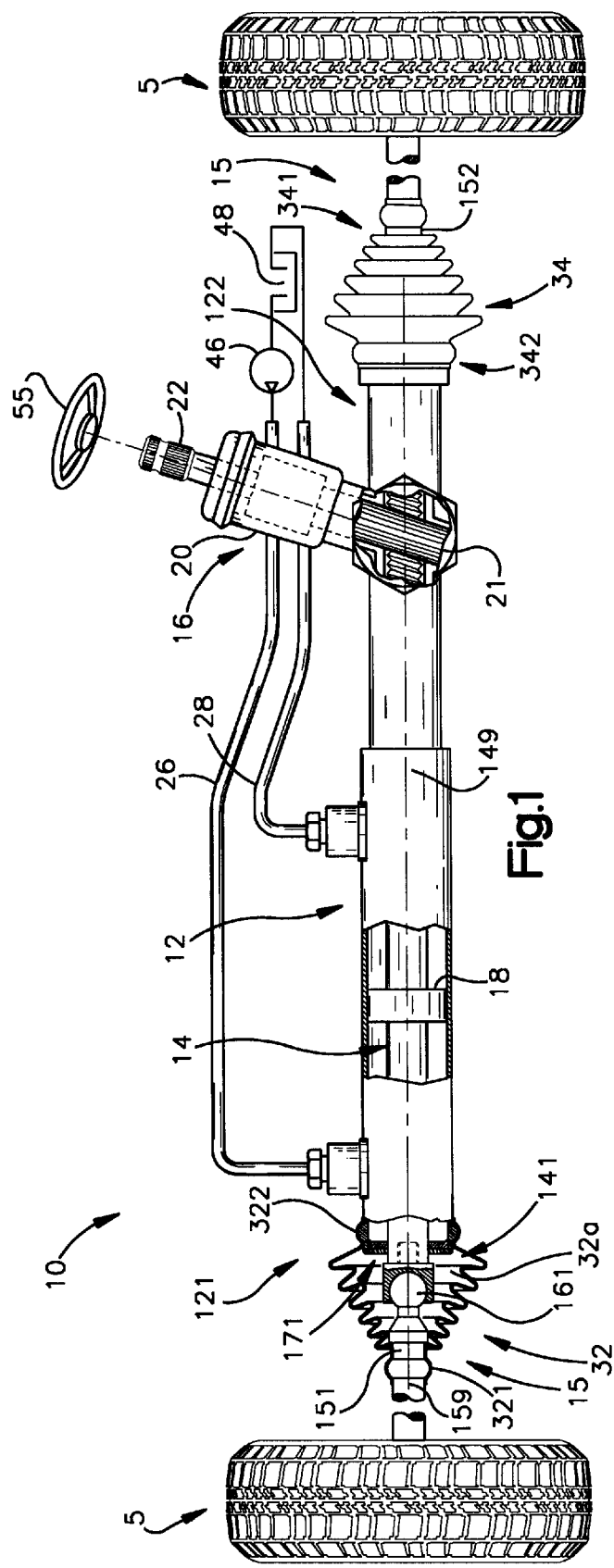
FIG. 1 is a schematic view of an apparatus constructed in accordance with the present invention.

As representative of the present invention, FIG. 1 illustrates a rack and pinion steering apparatus 10 for a vehicle. The apparatus 10 includes a housing 12 and a rack 14, both having a common longitudinal axis 149. The rack 14 is supported by, and is axially movable relative to, the housing 12. The housing 12 has a first end 121 and a second end 122 opposite the first end.

The rack 14 has a first end portion 141 and a second end portion (not shown) opposite the first end portion. The first end portion 141 is supported by a first bearing 171 in the first end 121 of the housing 12. The second end portion of the rack 14 is supported by a second bearing (not shown) in the second end 122 of the housing 12, similar to the first end portion 141. The rack 14 is connected to steerable vehicle wheels 5 of the vehicle by a suitable linkage 15. The linkage 15 includes a first tie rod 151 and a second tie rod 152.

The first tie rod 151 is connected to the first end portion 141 of the rack 14 by a first ball joint 161 in a known manner. The second tie rod 152 is connected to the second end portion of the rack 14 by a second ball joint (not shown) in a known manner. Upon axial movement of the rack 14 relative to the housing 12, the steerable vehicle wheels 5 are turned in a known manner.

The apparatus 10 includes a hydraulic motor 16 for axially moving the rack 14 to turn the steerable vehicle wheels 5. The hydraulic motor 16 includes a piston 18 that is fixedly connected to the rack 14. A power steering control valve 20 actuates the hydraulic motor 16. The power steering control valve 20 has an input shaft 22 that is connected with a steering wheel 55 of the vehicle. Upon rotation of the input shaft 22 by the steering wheel 55 of the vehicle, the power steering control valve 20 ports fluid, from a pump 46, to the hydraulic motor 16 through one of a pair of conduits 26 or 28 and connects the hydraulic motor with a reservoir 48 through the other conduit. The pressure of the fluid causes the piston 18, and thereby the rack 14, to move axially.

The power steering control valve 20 is mechanically connected with the rack 14 by a pinion 21. Teeth on the pinion 21 are disposed in meshing engagement with teeth on the rack 14. Operation of the hydraulic motor 16 moves the rack 14 and drives the pinion in a follow-up manner to return the power steering control valve 20 to a neutral condition when the steerable vehicle wheels 5 have been turned to an extent corresponding to rotation of the steering wheel 55 and input shaft 22.

Although the apparatus 10 includes the hydraulic motor 16, it is contemplated that the apparatus 10 could include another type of motor, such as an electric motor. It is also contemplated that the apparatus 10 could be manually actuated and not include power assistance at all.

Figure 2:
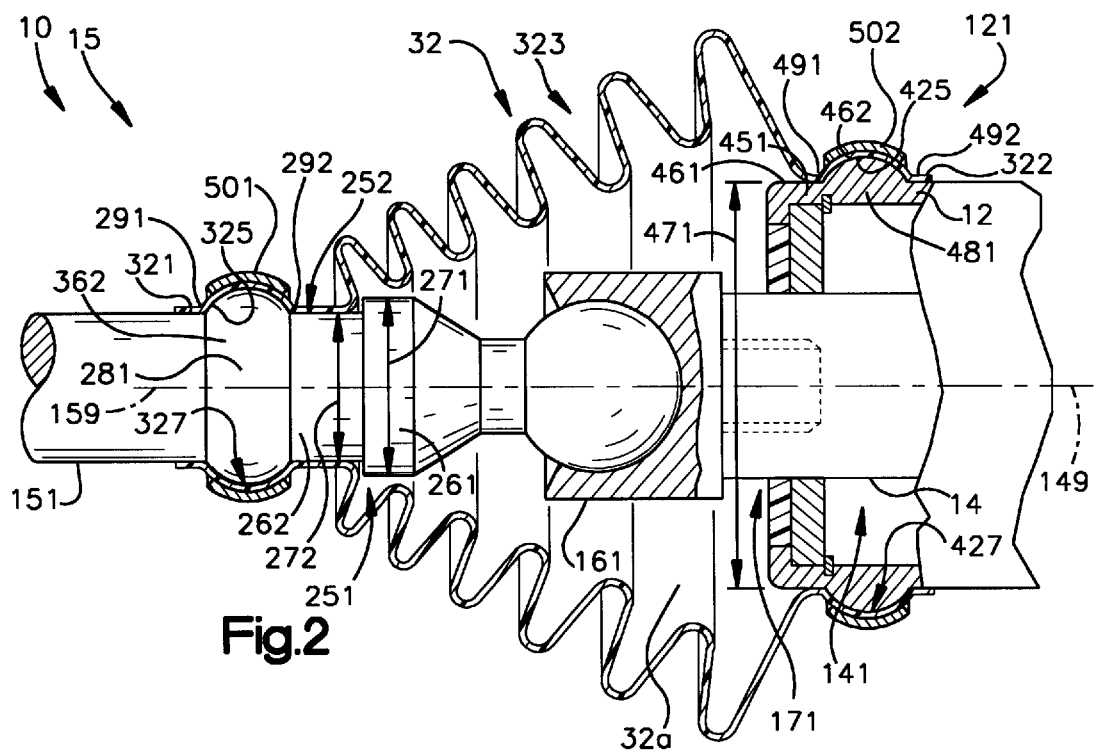
FIG. 2 is an enlarged schematic view of part of the apparatus of FIG. 1.
Figure 3:
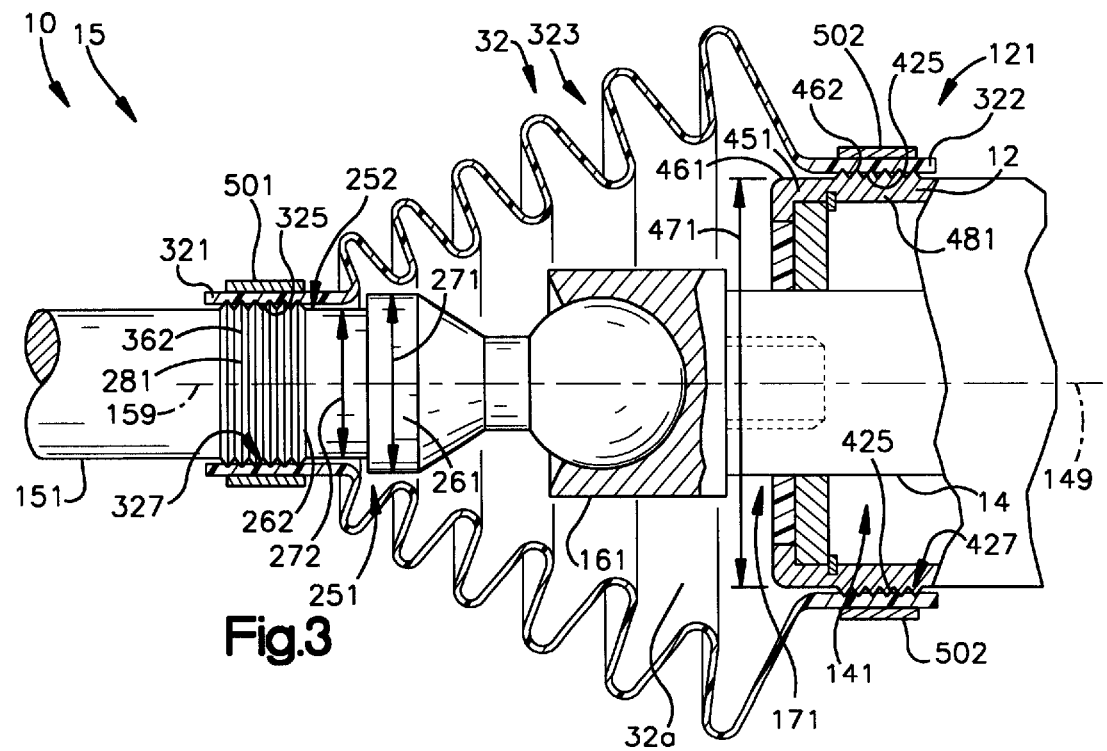
FIG. 3 is a schematic view similar to FIG. 2 illustrating another embodiment of the present invention.

As viewed in FIGS. 2 and 3, a first boot seal 32 has a bellows 323 interposed between a first tie rod seal portion 321 and a first housing seal portion 322. The tie rod seal portion 321 is at one end of the boot seal 32 and the first housing seal portion 322 is at the opposite end of the boot seal 32. The first tie rod seal portion 321 is connected with the exterior of the first tie rod 151. The first housing seal portion 322 is connected with the exterior of the first end 121 of the housing 12. The first boot seal 32 forms a sealed first chamber 32a around the first ball joint 161 and the first bearing 171.

A second boot seal 34 has a bellows interposed between a second tie rod seal portion 341 and a second housing seal portion 342. The second tie rod seal portion 341 is at one end of the boot seal 34 and the second housing seal portion 342 is at the opposite end of the boot seal 34. The second tie rod seal portion 341 is connected with the exterior of the second tie rod 152. The second housing seal portion 342 is connected with the exterior of the second end 122 of the housing 12. The second boot seal forms a sealed second chamber (not shown) around the second ball joint and the second bearing.

The first and second boot seals 32 and 34 have a physical configuration and construction that allows the tie rod seal portions 321 and 341 to seal against the first and second tie rods 151 and 152, respectively, and the housing seal portions 322 and 342 to seal against the ends 121 and 122 of the housing 12, respectively, even as the rack 14 repeatedly moves relative to the housing 12.

The first tie rod 151 has a longitudinal axis 159 that may or may not be coincident with the axis 149 of the rack 14, depending upon the orientation of the first ball joint 161. The first tie rod 151 further has a first cylindrical portion 251 with a first outer surface 261 of a first diameter 271 and a second cylindrical portion 252 coaxial with the first cylindrical portion. The second cylindrical portion 252 has a second outer surface 262 of a second diameter 272. The second diameter 272 is smaller than the first diameter 271. The first tie rod seal portion 321 of the first boot seal 32 completely encircles the second cylindrical portion 252.

The first tie rod 151 includes a first ring portion 281 projecting radially from the second outer surface 262 of the second cylindrical portion 252. The first ring portion 281 extends circumferentially completely around the axis 159 of the first tie rod 151. The first ring portion 281 is spaced axially from the first cylindrical portion 251. The first ring portion 281 has an outer convex surface 362 extending axially along the second cylindrical portion 252.

The first tie rod seal portion 321 of the first boot seal 32 has a first concave sealing surface 325 in sealing contact with the convex outer surface 362 of the first ring portion 281. The first sealing surface 325 defines a first groove 327 in the first tie rod seal portion 321. The first ring portion 281 is located in the first groove 327. The first groove 327 is formed during molding of the boot seat 32.

The first ring portion 281 may be torus-shaped (as viewed in FIG. 2). The torus-shaped first ring portion 281 has the outer convex surface 362 that curves radially outward from axially spaced locations 291 and 292 on the second outer surface 262 of the second cylindrical portion 252. The first groove 327 of the first tie rod seal portion 321 of the first boot seal 32 has a shape corresponding to the torus-shaped first ring portion 281 such that the first groove 327 is defined by a surface that curves outward radially from the axially spaced locations 291 and 292 when the first boot seal 32 is installed on the first tie rod 151.

Alternatively, the first ring portion 281 may include male threads extending radially from the second outer surface 262 of the second cylindrical portion 252 (as viewed in FIG. 3). The first groove 327 of the first tie rod seal portion 321 of the first boot seal 32 at least partially defines corresponding female threads. The male threads and the female threads may be screwed together.

The first end 121 of the housing 12 has a third cylindrical portion 451 with a third outer surface 461 of a third diameter 471. The first housing seal portion 322 of the first boot seal 32 encircles the third cylindrical portion 451.

The first end 121 of the housing 12 includes a second ring portion 481 projecting radially from the third outer surface 461 of the first end 121. The second ring portion 481 extends circumferentially completely around the axis 149 of the first end 121. The second ring portion 481 has a convex outer surface 462 extending axially along the third cylindrical portion 451.

The first housing seal portion 322 of the first boot seal 32 has a concave second sealing surface 425 in sealing contact with the outer surface 462 of the second ring portion 481. The second sealing surface 425 defines a second groove 427 in the first housing seal portion 322. The second ring portion 481 is located in the second groove 427. The second groove 427 is formed during molding of the boot seal 32.

The second ring portion 481 may be torus-shaped (as viewed in FIG. 2). The outer surface 462 of the torus-shaped second ring portion 481 is convex and curves radially outward from respective axially spaced locations 491 and 492 on the third outer surface 461 of the third cylindrical portion 451. The second groove 427 of the first housing seal portion 421 of the first seal boot 32 has a shape corresponding to the torus-shaped second ring portion 482 such that the second groove 427 is concave and is defined by a surface that curves outward radially from the axially spaced locations 491 and 492 when the first boot seal 32 is installed on the first end 121 of the housing 12.

During assembly, the boot seal 32 may be moved axially from the left (as viewed in FIG. 2) over the tie rod 151 and the ball joint 161 so that the first tie rod seal portion 321 and the first housing seal portion 322 are adjacent the first torus-shaped ring portion 281 and the second torus-shaped ring portion 481, respectively. The seal portions 321, 322 may then be twisted and moved axially, either simultaneously or sequentially, over the torus-shaped ring portions 281, 481. While the right side parts (as viewed in FIG. 2) of the seal portions 321, 322 may be minimally stretched during this assembly procedure, the left side parts of the seal portions will not be stretched at all.

Alternatively, the second ring portion 481 may include male threads extending radially from the third outer surface 461 of the third cylindrical portion 451 (as viewed in FIG. 3). The first housing seal portion 421 of the first boot seal 32 would then have corresponding female threads.

During assembly, the boot seal 32 may be moved axially from the left (as viewed in FIG. 3) over the tie rod 151 and the ball joint 161 so that the first tie rod seal portion 321 and the first housing seal portion 322 are adjacent the first threaded ring portion 281 and the second threaded ring portion 481, respectively. The seal portions 321, 322 may then be threaded simultaneously to the right (as viewed in FIG. 3) onto the threaded ring portions 281, 481, which both have right-hand male threads or both have left-hand male threads to match the female threads of the boot seal 32. The threaded ring portions 281, 481 will not be stretched at all during this assembly procedure.

While only the first boot seal is shown in FIGS. 2 and 3, the second boot seal 34 may have either of the above-described sealing features (i.e., torus shaped ring portion or threads). First and second clamps (indicated schematically at 501 and 502 in FIG. 2) may further strengthen the seal at the tie rod 151 or 152 and the housing 12 when using either of the above-described sealing features (FIGS. 2 or 3).

The first and second boot seals 32 and 34 may be constructed of a suitable material such as a polyester thermoplastic elastomer. One such material is ECDEL™, a trademark of EASTMAN CHEMICAL PRODUCTS, INC. A preferred grade of ECDEL™ for the present invention is 9967. Grade 9967 has a melt temperature of 205° C. to 230° C. (400° F. to 445° F.).

Grade 9967 has excellent percent elongation to break, flexibility, stretchability, as well as a high degree of puncture resistance. Further, Grade 9967 is continuously extrudable and stretch-toughenable and can be formed by a vacuum molding process. This property dramatically reduces the cost of manufacture compared to conventional blow molding procedures, which are batch procedures.

By using a stretch-toughenable polyester resin such as grade 9967, the stretch-toughened boot seals 32 and 34 additionally are resistant to temperature induced shrinkage. Thus, failures caused by interference of the boot seals 32 and 34 with the linkage are reduced.

The first and second boot seals 32 and 34 may alternatively be constructed of an un-vulcanized rubber with an interspersed polymer. Santoprene™, a trademark of MONSANTO and EXXON, is one such material. Santoprene™ is un-vulcanized EPDM rubber with interspersed polypropylene. This material maintains its strength and sealing characteristics over time.

It should be clear that the boot seals 32 and 34 may be installed with a minimum of stretching of the boot seals. In fact, the FIG. 3 embodiment requires no stretching of the boot seals at all.

From the above description of the invention, those skilled in the art will perceive improvements, changes and modifications in the invention. Such improvements, changes and modifications within the skill of the art are intended to be covered by the appended claims.

Having described the invention, the following is claimed:

1. An apparatus comprising:
   a tie rod for a vehicle steering system, said tie rod having a longitudinal axis, a first cylindrical portion with a first outer surface of a first diameter, and a second cylindrical portion coaxial with said first cylindrical portion, said second cylindrical portion having a second outer surface of a second diameter, said second diameter being smaller than said first diameter; and
   a boot seal encircling said second cylindrical portion,
   said tie rod having a ring portion projecting radially from said second outer surface of said second cylindrical portion, said ring portion extending circumferentially completely around said axis of said tie rod, said ring portion being spaced axially from said first cylindrical portion, said ring portion having a third outer surface extending axially along said second cylindrical portion,
   said boot seal having a sealing surface in sealing contact with said third outer surface of said ring portion, said sealing surface defining a groove in said boot seal, said ring portion being located in said groove.

2. The apparatus as set forth in claim 1 wherein said ring portion is torus-shaped and curves radially outward from axially spaced locations on said second outer surface of said second cylindrical portion.

3. The apparatus as set forth in claim 1 wherein said ring portion comprises at least part of male threads extending radially from said second outer surface of said second cylindrical portion.

4. The apparatus as set forth in claim 1 wherein said boot seal includes a first end portion engaging said ring portion of said tie rod and a second end portion engaging a housing for the vehicle steering system, said second end portion being opposite said first end portion.

5. The apparatus as set forth in claim 4 wherein said housing comprises a fourth cylindrical portion with a fourth outer surface of a fourth diameter.

6. The apparatus as set forth in claim 5 wherein said second end portion of said boot seal encircles said fourth cylindrical portion.

7. The apparatus as set forth in claim 6 wherein said housing has a ring portion projecting radially from said fourth outer surface of said fourth cylindrical portion, said ring portion of said housing extending circumferentially completely around said axis, said ring portion of said housing being spaced axially from said fourth cylindrical portion, said ring portion of said housing further having a fifth outer surface extending axially along said ring portion of said housing.

8. The apparatus as set forth in claim 7 wherein said second end portion of said boot seal has a sealing surface in sealing contact with said fifth outer surface of said ring portion of said housing, said sealing surface of said second end portion defining a groove in said second end portion of said boot seal, said ring portion of said housing being located in said groove of said second end portion.

9. An apparatus comprising:

a tie rod for a vehicle steering system, said tie rod having a longitudinal axis, a first cylindrical portion with a first outer surface of a first diameter, and a second cylindrical portion coaxial with said first cylindrical portion, said second cylindrical portion having a second outer surface of a second diameter, said second diameter being smaller than said first diameter; and a boot seal encircling said second cylindrical portion, said tie rod having a torus-shaped ring portion projecting radially from said second outer surface of said second cylindrical portion, said torus-shaped ring portion extending circumferentially completely around said axis of said tie rod, said torus-shaped ring portion being spaced axially from said first cylindrical portion, said ring portion having a third outer surface extending axially along said second cylindrical portion, said torus-shaped ring portion curving radially outward from axially spaced locations on said second outer surface of said second cylindrical portion, said boot seal having a sealing surface in sealing contact with said third outer surface of said torus-shaped ring portion, said sealing surface defining a groove in said boot seal, said torus-shaped ring portion being located in said groove.

10. The apparatus as set forth in claim 9 further including a housing for the vehicle steering system, said housing having a torus-shaped ring portion projecting radially from said housing.

11. The apparatus as set forth in claim 10 wherein said boot seal includes a first end portion engaging said torus-shaped ring portion of said tie rod and a second end portion engaging said torus-shaped ring portion of said housing, said first end portion being opposite said second end portion.

12. An apparatus comprising:

a tie rod for a vehicle steering system, said tie rod having a longitudinal axis, a first cylindrical portion with a first outer surface of a first diameter, and a second cylindrical portion coaxial with said first cylindrical portion, said second cylindrical portion having a second outer surface of a second diameter, said second diameter being smaller than said first diameter; and a boot seal encircling said second cylindrical portion, said tie rod having a ring portion projecting radially from said second outer surface of said second cylindrical portion, said ring portion extending circumferentially completely around said axis of said tie rod, said ring portion being spaced axially from said first cylindrical portion, said ring portion having a third outer surface extending axially along said second cylindrical portion, said ring portion comprising at least part of male threads extending radially from said second cylindrical portion, said boot seal having a sealing surface in sealing contact with said third outer surface of said ring portion, said sealing surface defining a groove in said boot seal, said ring portion being located in said groove, said groove comprising at least part of female threads engaging said male threads of said tie rod.

13. The apparatus as set forth in claim 12 wherein said boot seal has a first end portion that engages said tie rod and a second end portion for engaging a housing of the vehicle steering system, said second end portion being opposite said first end portion.

14. The apparatus as set forth in claim 13 wherein said second end portion of said boot seal has female threads for engaging male threads on said housing.

* * * * *